United States Patent
Yanagita

[19]

[11] Patent Number: 6,160,584
[45] Date of Patent: *Dec. 12, 2000

[54] MOTION DETECTION AND MOTION COMPENSATIVE PREDICTION CIRCUIT

[75] Inventor: Yukio Yanagita, Kanagawa, Japan

[73] Assignee: Sony Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/080,927

[22] Filed: May 19, 1998

[30] Foreign Application Priority Data

May 21, 1997 [JP] Japan ................................... 9-131079

[51] Int. Cl.$^7$ ........................................................ H04N 7/12
[52] U.S. Cl. ........................... 348/402; 348/416; 348/699
[58] Field of Search ..................................... 348/699, 384, 348/390, 400, 401, 402, 409, 415, 416; 382/232, 236, 238; H04N 7/12

[56] References Cited

U.S. PATENT DOCUMENTS 5,488,419  1/1996  Hui et al. ............................. 348/402
5,623,313  4/1997  Naveen ................................. 348/416

*Primary Examiner*—Young Lee
*Attorney, Agent, or Firm*—Rader, Fishman & Grauer; Ronald P. Kananen

[57] ABSTRACT

A motion detecting and motion compensative prediction circuit includes an integer pixel accuracy calculating unit for carrying out calculation for detecting, with an integer pixel accuracy, a portion most approximate to an object of a current frame from a predetermined reference frame, and a half pixel accuracy calculating and motion compensative prediction unit (including a buffer memory, a re-arranging unit for rearranging a picture data supplied thereto through the buffer memory by a pixel unit, and an interpolation unit for subjecting the picture data re-arranged by the re-arranging unit to linear interpolation calculation). The buffer memory, the re-arranging unit and the interpolation means of the half-pixel accuracy calculating and motion compensative prediction unit are commonly employed both of a processing for detecting a half-pixel accuracy motion vector based on the calculation result of the integer pixel accuracy calculating unit and a processing for generating a predictive-coded picture by using the motion vector.

1 Claim, 6 Drawing Sheets

MOTION DETECTION AND MOTION COMPENSATIVE PREDICTION CIRCUIT

BACKGROUND

1. Field of the Invention

The present invention relates to a circuit for detecting a motion vector and carrying out motion-compensated interframe predictive coding in an encoder for compressing picture data and the like.

2. Description of the Related Art

An MPEG (Moving Picture Experts Group) standard is known as a typical coding standard for compressing a motion picture. The MPEG standard includes an MPEG 1 standard for storage media and an MPEG 2 standard for general purpose. Each of them is a system utilizing both a motion-compensated predictive coding and a discrete cosine transform (DCT).

FIG. 2 is a diagram for showing a basic arrangement of an MPEG encoder. An A/D converter 11 converts a video signal formed of a luminance signal Y and color difference signals Cb, Cr supplied thereto into a digital signal and then supplies it to a format converting circuit 12. The format converting circuit 12 converts a format of the supplied digital signal into a signal having a spatial resolution used for encoding, and then supplies the converted signal to a frame arranging circuit 13. The frame arranging circuit 13 re-arranges the supplied video signal by a frame unit in response to picture types of an intra-coded picture (I picture), a predictive-coded picture (P picture) and a bidirectionally predictive-coded picture (B picture), in order to encode a B picture by using frames preceding and succeeding the B picture as a function of time.

A motion detecting circuit 14 (including an integer pixel accuracy calculating unit 14a and a half pixel accuracy calculating unit 14b) and a motion compensative prediction circuit 15 generate a predictive picture described later on, and then supply the predictive picture to a subtracter 16. The subtracter 16 is supplied also with the picture from the frame arranging circuit 13, and calculates a difference (i.e., a predictive error picture) between the predictive picture and the picture supplied from the frame arranging circuit 13.

A DCT circuit 17 is supplied with the predictive error picture from the subtracter 16 and DCT encodes the predictive error picture. A quantizer circuit 18 quantizes the predictive error picture from the DCT circuit 17 and then supplies it to a variable length coding circuit 19. The variable length coding circuit 19 variable-length-codes the supplied predictive error picture together with the motion vector supplied from the motion detecting circuit 14 and so on, and then supplies the encoded data to a buffer memory 20 for storing the encoded data. The encoded data is output from the buffer memory 20 in a format of a coded bit stream according to the MPEG standard.

If a picture is the I picture or the P picture, then an information about information at the quantizing circuit 14 is restored to a predictive error picture by an inverse quantizer circuit 21 and an inverse DCT circuit 22 in order to employ the picture as a reference frame for the succeeding motion detecting processing and the succeeding motion compensative prediction processing. The predictive error picture from the inverse DCT circuit 22 and the predictive picture from the motion compensative prediction circuit 15 are added by an adder 23, and then stored in a frame memory 24.

FIG. 3 is a diagram showing a principle of a processing carried out the motion detecting circuit 14 and the motion-compensation predicting coding circuit 15, of the processings of the MPEG encoder. A portion Y (shown in FIG. 3B) most approximate to an object X (shown in FIG. 3A) of a current frame is detected from a reference frame (i.e., a frame succeeding or preceding the current frame), and a movement amount from a position of the object X to a position of the portion Y is detected as a motion vector VC (as shown in FIG. 3C). The motion vector VC is generally detected with respect to a picture in each of plural small blocks into which a frame is divided (a block matching method).

The portion Y in the reference frame is shifted by using the motion vector, thereby a predictive picture Y' in the current frame being generated (as shown in FIG. 3D). A predictive error picture Z (shown in FIG. 3E) which a difference between the object X and the predictive picture Y' is calculated, and then is to be encoded.

The motion detecting circuit 14 and the motion compensative prediction circuit 15 have arrangements shown in FIGS. 4 to 6 which are diagrams showing function blocks thereof in order to detect the motion vector and generate a predictive coded picture.

As shown in FIG. 4, an integer pixel accuracy calculating unit 14a of the motion detecting circuit 14 derives from the frame memory 24 picture data of block units of the current frame (reference block data BD) and picture data of blocks in a predetermined search area of a reference frame (i.e., a frame preceding or succeeding the current frame) (search data SD).

The integer pixel accuracy calculating unit 14a calculates, by using an integer pixel accuracy, a portion (e.g., the portion Y shown in FIG. 3B) most approximate to the object (i.e., the object X shown in FIG. 3A) of the current frame and its position with respect to each of the preceding reference frame and the succeeding reference frame. The integer pixel accuracy calculating unit 14a supplies data OD indicative of a result of this calculation to a half pixel accuracy calculating unit 14b of the motion detecting circuit 14 together with the search data SD from the frame memory 24.

As shown in FIG. 5, in the half pixel accuracy calculating unit 14b, the calculation result data OD and the search data SD are input through a buffer memory 31 thereof to a pixel data input unit 32 thereof. The pixel data input unit 32 has a function to rearrange the picture data by a pixel unit. The pixel data input unit 32 can rearrange the picture data so that a picture data at the position calculated by the integer pixel accuracy calculating unit 14a and picture data at the positions above and under the position should be located side by side, so that a picture data at the position calculated by the integer pixel accuracy calculating unit 14a and picture data at the positions on the left and right sides of the position should be located side by side, and so that a picture data at the position calculated by the integer pixel accuracy calculating unit 14a and picture data at the positions diagonally above and under the position should be located side by side.

An interpolation pixel data generating unit 33 has a function to carry out a linear interpolation calculation. The interpolation pixel data generating unit 33 subjects to the linear interpolation the picture data at the position obtained by the integer pixel accuracy calculating unit 14a and the picture located by the pixel data input unit 32 at the side of the above picture data, calculating picture data ID at eight positions displaced from the position calculated by the integer pixel accuracy calculating unit 14a in the upward, downward, left, right and diagonal directions by a unit of half pixel (0.5 pixel).

A subtracter 34 calculates difference between each of the picture data ID and the reference block data BD supplied thereto from the frame memory 24 (shown in FIG. 2) through the pixel data input unit 32. A residual comparing unit 35 compares magnitudes of these differences and detects a position with the smallest difference to output an amount of movement between the position and a position of the object as a motion vector VC (as shown in FIG. 3C).

The respective motion vectors VC are detected with half-pixel accuracy with reference to the succeeding and preceding reference frames as described above. The half pixel accuracy calculating unit 14b supplies these motion vector to the motion compensative prediction circuit 15 and also to the variable-length coding circuit 19.

As shown in FIG. 6, the motion compensative prediction circuit 15 is input, through a buffer memory 41, with the motion vector VC from the half-pixel accuracy calculating unit 14b and with the search data SD from the frame memory 24. A pixel data input unit 42 has a function to re-arrange a picture data by a pixel unit. The pixel data input unit 42 re-arranges the picture data so as to shift picture data of portions most approximate to the object in the preceding and succeeding reference frame by using the respective motion vectors vc, thereby generating the predictive-coded picture data FD (data indicative of the portion Y' shown in FIG. 3D) in the current frame from the preceding and succeeding reference frames.

An interpolation pixel data generating unit 43 has a function to carry out linear interpolation calculation. The interpolation pixel data generating unit 43 subjects to linear interpolation the predictive-coded picture data FD generated from the preceding reference frame by the pixel data input unit 42 and the predictive-coded picture data FD generated thereby from the succeeding reference frame, thereby calculating an average predictive-coded picture data AFD obtained by averaging the both predictive-coded picture data FD. Then, the interpolation pixel data generating unit 43 supplies the predictive-coded picture data AFD calculated thereby to a subtracter 44.

The subtracter 44 is supplied with the above predictive-coded picture data AFD from the interpolation pixel data generating unit 43 to calculate a predictive error picture data EFD (i.e., data indicative of the portion Z shown in FIG. 3E) which is a difference between the predictive-coded data AFD and a reference block data BD supplied from the frame memory (shown in FIG. 2) through the pixel data input unit 42. The predictive-coded picture data AFD calculated by the interpolation pixel data generating unit 43 is also supplied to the adder 23 shown in FIG. 2 as described above.

Since various equipments (e.g., a video cassette recorder and so on) mounted with an MPEG encoder or other picture compression encoders gradually tends to be downsized, efforts and attention have been focused on further miniaturization of a circuit scale of each of such encoders.

SUMMARY OF THE INVENTION

In view of such aspects, it is an object of the present invention to provide a motion-detecting and motion compensative prediction circuit having a smaller circuit scale.

A motion detecting and motion compensative prediction circuit according to the present invention is roughly divided into two circuit parts:

(1) an integer pixel accuracy calculating unit for carrying out calculation for detecting, with an integer pixel accuracy, a portion most approximate to an object of a current frame from a predetermined reference frame; and (2) a half pixel accuracy calculating and motion compensative prediction unit including a buffer memory, a re-arranging means for rearranging a picture data supplied thereto through the buffer memory by a pixel unit, and an interpolation means for subjecting the picture data re-arranged by the re-arranging means to linear interpolation calculation.

According to an aspect of the present invention, the buffer memory, the re-arranging means and the interpolation means of the half-pixel accuracy calculating and motion compensative prediction unit are employed both of a processing for detecting a half-pixel accuracy motion vector based on the calculation result of the integer pixel accuracy calculating unit and a processing for generating a predictive-coded picture by using the motion vector.

Specifically, according to the present invention, in view of the fact that, as shown in FIGS. 5 and 6, a half-pixel accuracy calculating unit and a motion compensative prediction circuit respectively have circuits having common functions such as buffer memory 31 and 41, pixel data input units 32 and 42 and interpolation pixel data generating units 33 and 43, such circuits are commonly shared by the half-pixel accuracy calculating unit and the motion compensative prediction circuit.

Since this arrangement permits a scale of a circuit for motion detection and motion compensative prediction to be further downsized, the whole of an MPEG encoder, other picture compression encoders and so on can be downsized.

DESCRIPTION OF THE PREFERRED EMBODIMENTS

Figure 1:
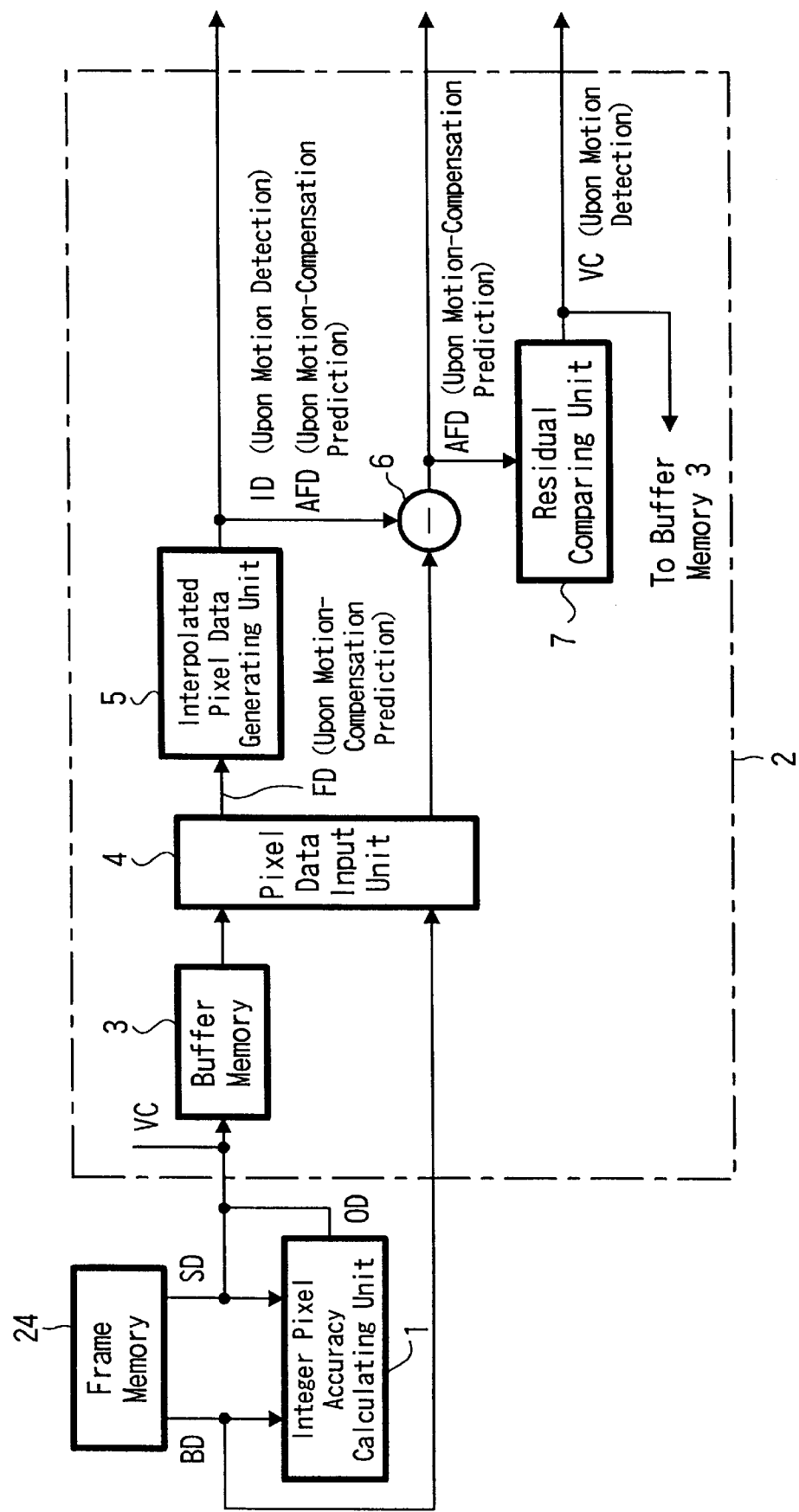
FIG. 1 is a diagram showing an arrangement of function blocks of a motion detecting and motion compensative prediction circuit according to the present invention by way of example.

FIG. 1 is a block diagram showing an arrangement of a motion detecting and motion compensative prediction circuit according to the present invention, by way of example.

Figure 2:
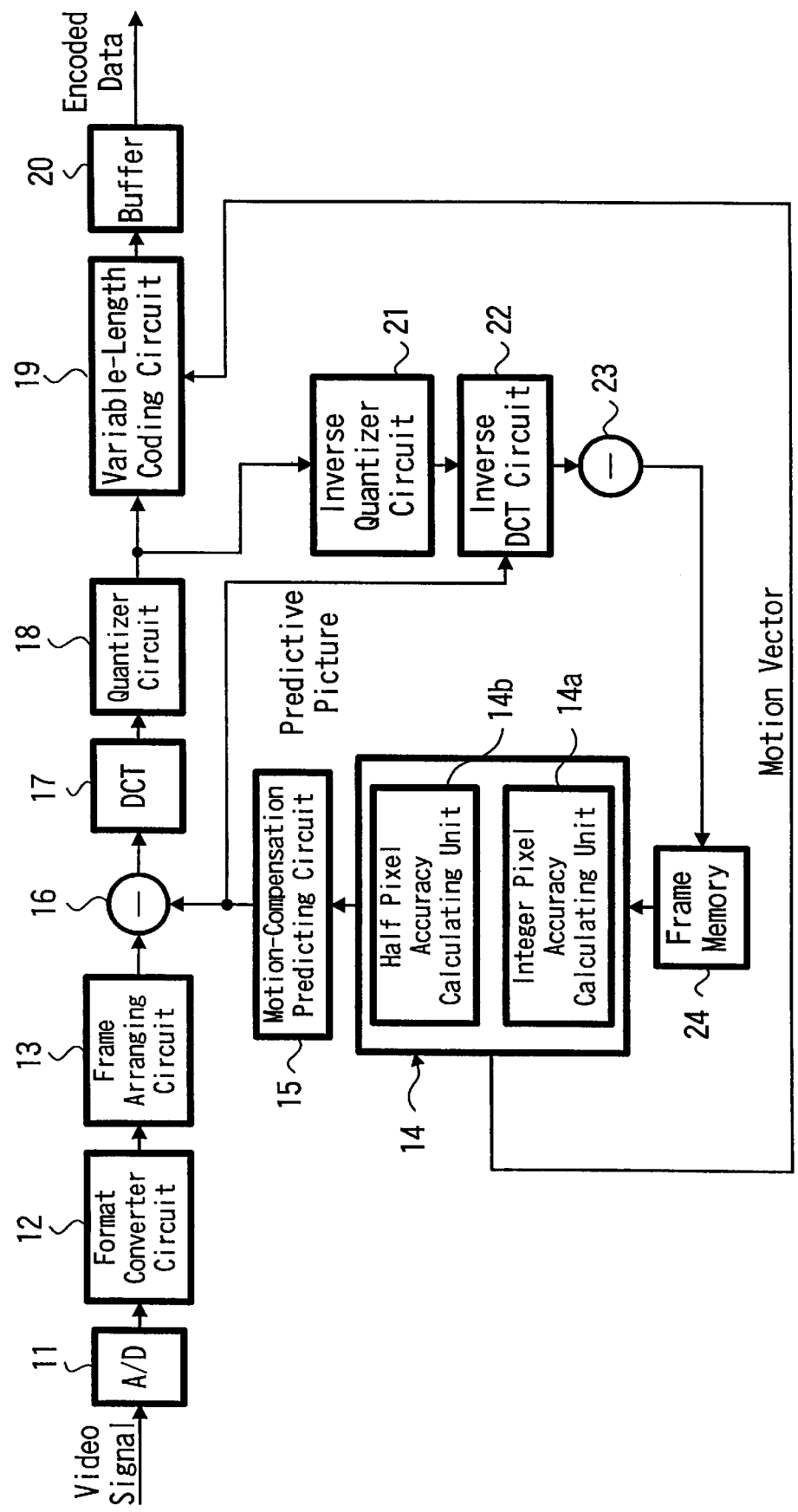
FIG. 2 is a diagram showing a basic arrangement of an MPEG encoder.
Figure 3:
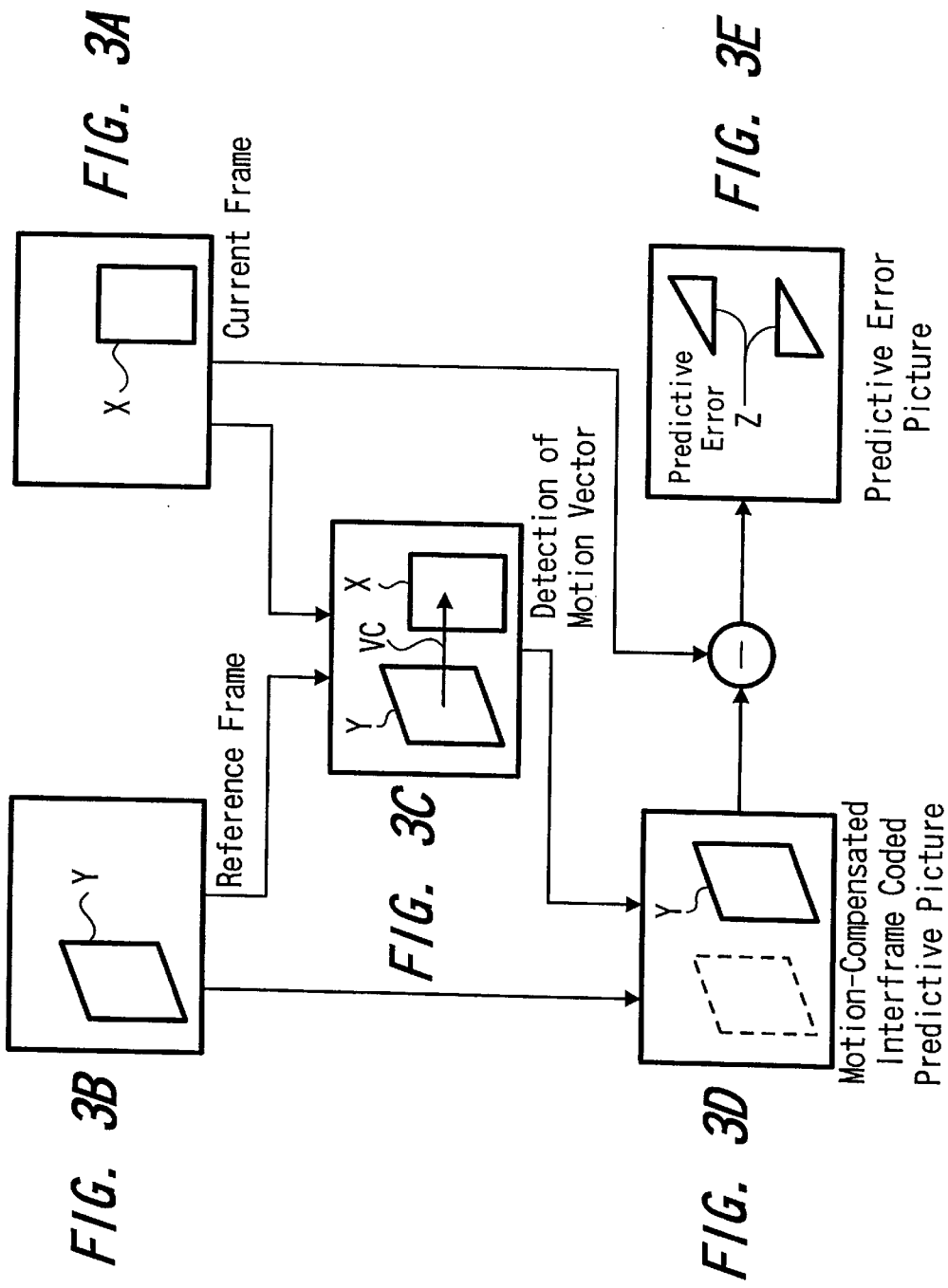
FIG. 3 consisting of FIGS. 3A through 3E is a diagram showing a principle of motion compensative prediction.
Figure 4:
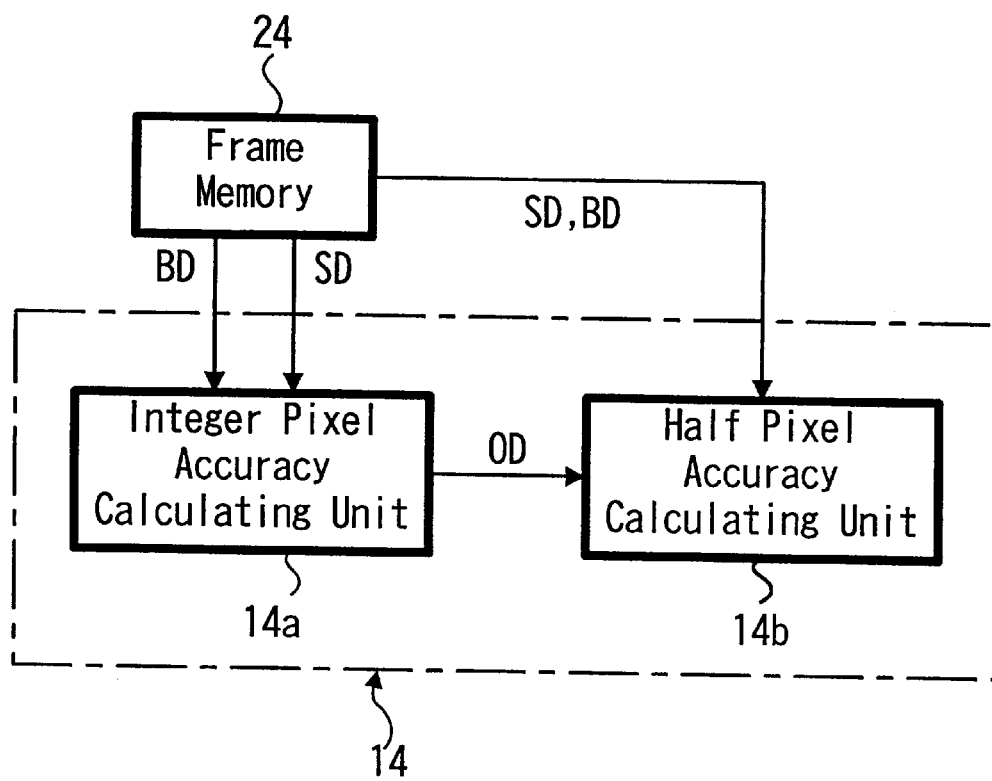
FIG. 4 is a diagram showing an arrangement of function blocks of a motion detecting circuit.

The motion detecting and motion compensative prediction circuit has an integer pixel accuracy calculating unit 1 has the same function as that of an integer pixel accuracy calculating unit 14a shown in FIG. 4. The integer pixel accuracy calculating unit 1, based on a reference block data BD and a search data SD from a frame memory 24 (shown in FIG. 2), carries out calculation for detecting, with an integer pixel accuracy, a portion (shown in FIG. 3B) most approximate to an object (shown in FIG. 3A) of a current frame and a position of the portion from a block in a search area of each of preceding and succeeding reference frames. The integer pixel accuracy calculating unit 1 supplies data OD indicative of the result of the calculation to a half-pixel accuracy calculating and motion compensative prediction unit 2 together with the search data SD from the frame memory 24.

The half-pixel accuracy calculating and motion compensative prediction unit 2 has a buffer memory 3, a pixel data input unit 4 for re-arranging a picture data supplied thereto through the buffer memory 3 by a pixel unit, an interpolation pixel data generating unit 5 carrying out the picture data re-arranged by the pixel data input unit 4 to linear interpolation calculation, a subtracter 6 for calculating difference between an output from the interpolation pixel data generating unit 5 and the reference block data BD supplied thereto from the frame memory 24 (shown in FIG. 2) through the pixel data input unit 4, and a residual comparing unit 7 for comparing magnitudes of the differences obtained by the subtracter 6.

Figure 5:
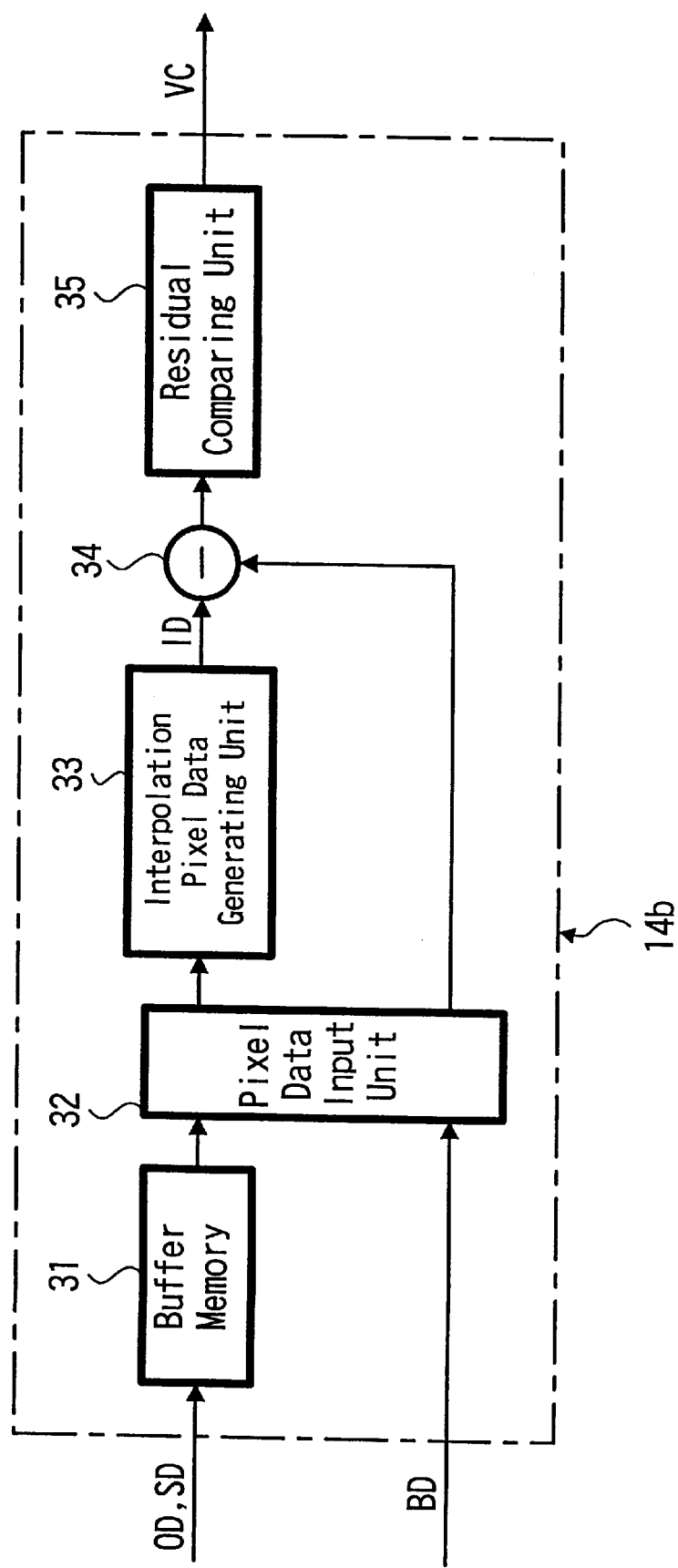
FIG. 5 is a diagram showing an arrangement of function blocks of a half pixel accuracy calculating unit circuit shown in FIG. 4.
Figure 6:
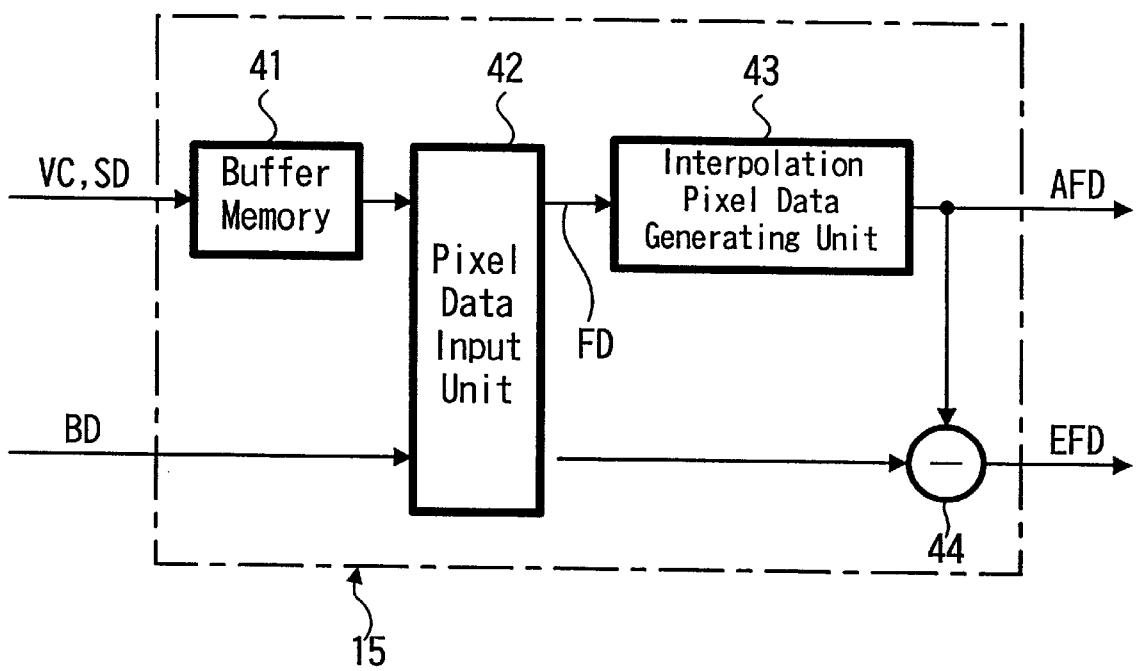
FIG. 6 is a diagram showing an arrangement of function blocks of a motion compensative prediction circuit.

The pixel data input unit 4 has the same function as those of pixel data input units 32 and 42 respectively shown in FIGS. 5 and 6. The interpolation pixel data generating units 5 has the same functions as those of interpolation pixel data generating units 33 and 43 respectively shown in FIGS. 5 and 6. The residual comparing unit 7 has the same as that of a residual comparing unit 35 shown in FIG. 5.

An operation of the half-pixel accuracy calculating and motion compensative prediction unit 2 will be described with respect to its operations upon detection of a motion vector and upon motion compensative prediction.

[Upon Detection of Motion Vector]

At this time, the data OD indicative of the calculation result supplied from the integer pixel accuracy calculating unit 1 and the search data SD from the frame memory 24 are input through the buffer memory 3 to the pixel data input unit 4. The pixel data input unit 4 can rearrange the picture data so that a picture data at the position calculated by the integer pixel accuracy calculating unit 1 and picture data at the positions above and under the position should be located side by side, so that a picture data at the position calculated by the integer pixel accuracy calculating unit 1 and picture data at the positions on the left and right sides of the position should be located side by side, and so that a picture data at the position calculated by the integer pixel accuracy calculating unit 1 and picture data at the positions diagonally above and under the position should be located side by side.

The interpolation pixel data generating unit 5 subjects to the linear interpolation the picture data at the position obtained by the integer pixel accuracy calculating unit 1 and the picture located by the pixel data input unit 4 at the side of the above picture data, thereby calculating picture data ID at eight positions displaced from the position calculated by the integer pixel accuracy calculating unit 1 in the upward, downward, left, right and diagonal directions by a unit of half pixel (0.5 pixel).

The subtracter 6 calculates difference between each of the picture data ID and the reference block data BD supplied thereto from the frame memory 24 (shown in FIG. 2) through the pixel data input unit 4. The residual comparing unit 7 compares magnitudes of these differences and detects a position with the smallest difference to output an amount of movement between the position and a position of the object as a motion vector VC (as shown in FIG. 3C).

The respective motion vectors VC are detected with half-pixel accuracy with reference to the succeeding and preceding reference frames as described above. The half pixel accuracy calculating and motion compensative prediction unit 2 supplies these motion vector VC back to the buffer 3 and also to a variable-length coding circuit 19 shown in FIG. 2.

[Upon Motion Compensative Prediction]

At this time, the pixel data input unit 4 is input, through the buffer memory 3, with the motion vector VC from the residual comparing unit 7 and with the search data SD from the frame memory 24. The pixel data input unit 4 re-arranges the picture data so as to shift picture data of portions most approximate to the object in the preceding and succeeding reference frame by using the respective motion vectors VC, thereby generating the predictive-coded picture data FD (data indicative of the portion Y' shown in FIG. 3D) in the current frame from the preceding and succeeding reference frames.

The interpolation pixel data generating unit 5 subjects to linear interpolation the predictive-coded picture data FD generated from the preceding reference frame by the pixel data input unit 4 and the predictive-coded picture data FD generated thereby from the succeeding reference frame, thereby calculating an average predictive-coded picture data AFD obtained by averaging the both predictive-coded picture data FD. Then, the interpolation pixel data generating unit 5 supplies the predictive-coded picture data AFD calculated thereby to a subtracter 6.

The subtracter 6 is supplied with the above predictive-coded picture data AFD from the interpolation pixel data generating unit 5 to calculate a predictive error picture data EFD (i.e., data indicative of the portion Z shown in FIG. 3E) which is a difference between the predictive-coded data AFD and a reference block data BD supplied from the frame memory 24 (shown in FIG. 2) through the pixel data input unit 4. The predictive-coded picture data AFD calculated by the interpolation pixel data generating unit 5 is also supplied to the adder 23 shown in FIG. 2 as described above.

As described above, according to the motion detecting and motion compensative prediction circuit of the present invention, the buffer memory 3, the pixel data input unit 4 and the interpolation pixel data generating unit 5 of the half-pixel accuracy calculating and motion compensative prediction unit 2 are employed both for a processing for detecting a half-pixel accuracy motion vector based on the result of calculation of the integer pixel accuracy calculating unit 1 and a processing for generating a predictive-coded picture by using the motion vector. Consequently, a scale of the circuit for motion detection and motion compensative prediction are further reduced.

This motion detecting and motion compensative prediction circuit may be applied to proper video-compression encoders for motion compensative prediction (e.g., encoders employing H. 261 standard which is an encoding standard for a video phone, a video conference and so on) other than to an MPEG encoder.

As described above, according to the present invention, since the scale of the circuit for the motion detection and the motion compensative prediction can be further reduced, it is possible to achieve an effect in which the whole of the circuits such as the MPEG encoder for motion-compensation predictive encoding, other picture-compression encoders and so on can be downsized.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A motion detecting and motion compensation prediction circuit comprising:

a frame memory carrying information regarding related image frames and providing outputs thereof to an integer pixel accuracy calculating unit that calculates relative position information of an object in different ones of said related image frames;

a buffer memory accepting output from said frame memory and said integer pixel accuracy calculating unit;

a pixel data input unit connected to said buffer memory and said frame memory for accepting data therefrom;

an interpolated pixel data generating unit connected to and for accepting the output of said pixel data input unit;

a subtractor accepting the output of said pixel data input unit and said interpolated pixel data generating unit and providing an output therefrom;

a comparison unit accepting the output of said subtractor and providing a motion vector output to at least said buffer memory;

wherein said buffer memory, said pixel data input unit, and said interpolated pixel data generating unit are operative during processing for the detection of a half-pixel accuracy motion vector based on a calculation result of said integer pixel accuracy calculating unit and during processing for generating a predictive-coded picture by using said motion vector.

* * * * *